(12) United States Patent
Nadin et al.

(10) Patent No.: US 8,141,433 B2
(45) Date of Patent: Mar. 27, 2012

(54) LEAK DETECTOR

(75) Inventors: Charles Michael Nadin, Harrogate (GB); David Cook, Leeds (GB)

(73) Assignee: Plant Test Services Ltd., Bromyard, Herefordshire (GB)

( * ) Notice: Subject to any disclaimer, the term of this patent is extended or adjusted under 35 U.S.C. 154(b) by 478 days.

(21) Appl. No.: 12/455,119

(22) Filed: May 28, 2009

(65) Prior Publication Data

US 2009/0293581 A1 Dec. 3, 2009

(30) Foreign Application Priority Data

May 28, 2008 (GB) .................................. 0809617.4

(51) Int. Cl.
*G01F 1/74* (2006.01)
(52) U.S. Cl. .................... 73/861.07; 73/1.06; 73/40.7
(58) Field of Classification Search ........................ None
See application file for complete search history.

(56) References Cited

U.S. PATENT DOCUMENTS

| 5,672,827 | A | * | 9/1997 | Jursich ........................ 73/861.07 |
| 6,279,569 | B1 | | 8/2001 | Berthon-Jones |
| 6,401,465 | B1 | * | 6/2002 | Meinzer ............................ 62/85 |
| 2007/0181192 | A1 | | 8/2007 | Choi et al. |
| 2008/0060421 | A1 | * | 3/2008 | Muller et al. ................... 73/49.2 |

FOREIGN PATENT DOCUMENTS

GB 2253701 A 9/1992

* cited by examiner

*Primary Examiner* — Robert R Raevis
(74) *Attorney, Agent, or Firm* — Klauber & Jackson LLC

(57) ABSTRACT

A method of measuring the gas flow of an incondensable gas in a flowing mixture of said incondensable gas and a condensable gas comprising the steps of calibrating a leak detector; injecting a known quantity of gauge gas at a known mass flow rate into said flowing mixture of gases; drawing a sample of the said gauge mix off at a sample point; passing said sample through a condenser so as to remove said condensable gas from the gauge mix, resulting in a test mix; passing the said test mix into the leak detector so as to measure the concentration of the gauge gas within the test mix; and calculating the mass flow rate of said incondensable gas within said flowing mixture. There is also provided a method of measuring the rate of ingress of an incondensable gas at an ingress point along a flow path of a flowing mixture of said incondensable gas and a condensable gas.

19 Claims, 2 Drawing Sheets

LEAK DETECTOR

RELATED APPLICATION

The present application claims the priority of GB Application Serial No. 0809617.4, filed May 28, 2008. The disclosure of the aforementioned application is incorporated by reference herein in its entirety, and applicants claim the benefits of this application under 35 U.S.C. §119.

BACKGROUND OF THE INVENTION

This invention relates to methods of detecting leaks in a fluid flow path, particularly when said fluid comprises a mixture of a condensable gas and an incondensable gas, and more particularly still, where said fluid flow path is at the outlet to a steam turbine.

Large condensing steam turbines used to produce power are responsible for producing a large proportion of the carbon dioxide emitted by the UK. As such, maximising efficiency of these turbines is very important both in terms of fuel cost to their operators and in relation to their environmental impact.

Turbines work by extracting energy, in the form of heat, from a working fluid and converting that heat energy into useful mechanical energy, for example, providing rotary power to an electrical generator. The more heat energy that is extracted from the fluid by the turbine, the more rotational energy it produces. As such, increasing the pressure difference across the turbine increases the energy extracted by the turbine, which results from a greater utilisation of the working fluid heat by the turbine. A major constraint on the efficiency of this type of system is the pressure of the steam turbine exhaust. Minimising this pressure results in the extraction of a greater amount of energy from the steam by increasing the pressure difference across the turbine. There is typically a water-cooled condenser situated at the turbine exhaust, which both condenses the steam and lowers the exhaust pressure. The condenser typically comprises a plurality of coolant tubes through which the cooling water flows, the heat from the steam being transferred to the tubes. The pressure of the exhaust within the condenser is typically known as the back-pressure.

The back-pressure may be elevated by a number of factors which include: high cooling water temperature within the condenser; low cooling water flow; low heat transfer rate between the turbine exhaust steam and the cooling water; and the presence of air in the steam being condensed.

The temperature of the steam in a given design of condenser is fixed by various parameters including cooling water temperature, cooling water flow and the heat transfer rate of the cooling water tubes, in combination with the mass flow rate of steam. The back-pressure in the absence of air is that corresponding to the saturation vapour pressure of the steam at that particular fixed temperature, and as such, any air that is present will create a partial pressure which must to be added to the saturation vapour pressure resulting in a greater back-pressure.

In addition, as the steam condenses, any incondensable air may surround the cooling tubes causing an effect known as air blanketing. This effect reduces the heat transfer rate of the tubes, hence the steam temperature is greater and, as such, the back-pressure is further increased.

Some air leakage into these complex systems is inevitable and so air is continuously removed from the condenser by vacuum pumps. If these fail or are overwhelmed by air due to excessive leakage into the condenser, the partial pressure of air steadily rises and may eventually result in damage to the turbine or a costly shutdown of the system.

When excess air is present in a condenser, the vacuum pumps reach equilibrium where the suction pressure corresponds to the mass flow rate of the air passing through the pump.

Although hereinbefore the condenser has been referred to, the portion of the system at vacuum comprises the condenser, turbine exhaust ducts, numerous ancillary vessels, vacuum pumps, connective pipework and instrumentation.

Typically, the vacuum pumps on a 500 MW turbo-generator unit can handle about 160 kg/hr of air before the back-pressure starts to rise. This equates to a single hole of approximately 10 $mm^2$ in a system that might comprise 1000 m of piping and 2400 $m^2$ of vessel surface area. It is therefore unsurprising that a major cause of high back-pressure is often excess air leakage.

To reduce the high back-pressure it is necessary to determine if the cause is the presence of excess air in the system as opposed to the other factors mentioned above and if so to identify whether it is due to poor vacuum pump performance or high air ingress. If high air ingress is the cause, it is necessary to find the source(s) of the leaks and quantify them, so that they may be repaired, or sealed, as needed.

Various systems are available to monitor the flow of air to the vacuum pumps. Typically, the devices fitted to UK power stations are unreliable, require frequent re-calibration and have limited operating range. They can only be used in pre-installed locations and can only handle a limited range of air/steam ratios.

Numerous techniques exist to find air leaks into a vacuum system, including smoke generators, ultrasonic noise detectors and tracer gas systems. All are capable of finding leaks and giving the order of magnitude but none can accurately measure the leakage rate.

It is an object of the present invention to ameliorate at least some of the hereinbefore-described disadvantages.

SUMMARY OF THE INVENTION

According to a first aspect of the invention there is provided a method of measuring the gas flow of an incondensable gas in a flowing mixture of said incondensable gas and a condensable gas comprising the steps of calibrating a leak detector at a given temperature and pressure with a calibration mixture supplied at a given flow rate, said calibration mixture comprising a gauge gas of known absolute concentration and said incondensable gas, the concentration of said gauge gas in the calibration mixture being measured by the leak detector; injecting a known quantity of gauge gas at a known mass flow rate into said flowing mixture of gases at an inlet point which is sufficiently spaced from a sample point, which is downstream of the inlet point, so as to ensure that, at said sample point, there is a uniform gauge mix of said gauge gas and said mixture of gases; drawing a sample of the said gauge mix off at said sample point; passing said sample through a condenser so as to remove said condensable gas from the gauge mix, resulting in a test mix; passing the said test mix into the leak detector at said given temperature, pressure and flow rate, so as to measure the concentration of the gauge gas within the test mix; and calculating the mass flow rate of said incondensable gas within said flowing mixture as a function of the concentration of gauge gas in the calibration mixture measured by the leak detector, concentration of the gauge gas in the test mix measured by the leak detector, mass flow rate of the injected gauge gas and the absolute concentration of the gauge gas within the calibration mixture.

Desirably, the absolute concentration of the gauge gas within the calibration mixture is measured by reference to national standards.

Advantageously, the method of measuring gas flow further comprises an additional step of cooling said test mix before it enters the leak detector. This not only removes additional moisture from the test mix, but also lowers the temperature of the test mix so that it is comparable to that of the gas used to calibrate the detector.

Preferably, the uncondensed portion of the gauge mix is passed through a cold trap to yield said test mix.

Desirably, the cold trap comprises a drain. This is so as to enable any moisture collected within the cold trap to be removed whilst the cold trap is in use.

Advantageously, a vacuum pump draws off the sample of the gauge mix.

Preferably, the cold trap is situated downstream of the vacuum pump with respect to the direction of flow of said test mix. This is because the vacuum pump may warm the gauge mix and as such must be re-cooled before it passes to the detector so as to yield accurate results.

Desirably, the gauge gas is a noble gas. This ensures that the gauge gas does not react with the flowing gas mixture, which would result in inaccurate results.

Advantageously, the leak detector has or is in communication with a display on which an output of the leak detector is displayable. As such results of the system can be read by a user.

Desirably, the leak detector has or is in communication with an electromagnetic transmitter by which an output of the leak detector is broadcastable. This enables the output of the detector to be monitored remotely.

Advantageously, the method of measuring said gas flow additionally comprises the steps of injecting a known quantity of a bias gas at a known mass flow rate into said flowing gas mixture upstream of the sample point, said bias gas comprising said incondensable gas; and determining the concentration of the gauge gas in the test mix in the absence of injected bias gas as a function of concentration of the gauge gas in the test mix measured by the leak detector whilst the bias gas is injected into said flowing mixture and concentration of the gauge gas within the test mix measured by said leak detector whilst the flowing gas mixture contains only said injected bias gas and said injected gauge gas. This technique can be used to offset the leak detector output downwards into a desirable measurement range closer to the calibration value.

According to a further aspect of the invention there is provided a method of measuring the rate of ingress of an incondensable gas, at a relatively high pressure, at an ingress point along a flow path of a flowing mixture of said incondensable gas and a condensable gas, at a relatively low pressure, comprising the steps of calibrating a leak detector at a given temperature and pressure with a calibration mixture supplied at a given flow rate, said calibration mixture comprising a gauge gas of known absolute concentration and said incondensable gas, the concentration of said gauge gas in the calibration mixture being measured by the leak detector; supplying a saturation mixture to said ingress point at flow rate sufficient such that only the saturation mixture enters said flow path via the ingress point, said saturation mixture comprising said incondensable gas and said gauge gas and being of known absolute concentration of gauge gas; selecting a sample point which is sufficiently spaced downstream from the ingress point such that the saturation mixture is uniformly mixed with said mixture of gases so as to form a uniform gas mix when or before it reaches the sample point; drawing a sample of the uniform gas mix off at said sample point; passing said sample through a condenser operating so as to remove said condensable gas from the uniform gas mix, resulting in a test mix; passing said test mix into the inlet of the leak detector at said given temperature, pressure and flow rate, so as to measure the concentration of the gauge gas within the test mix; determining the mass flow rate of said incondensable gas within said flowing mixture in accordance with the first aspect of the invention; and calculating the mass flow rate of the ingress of the incondensable gas as a function of the concentration of gauge gas in the calibration mixture measured by the leak detector, absolute concentration of the gauge gas in the saturation mixture, concentration of gauge gas in the test mix measured by the leak detector whilst the leak zone is flooded by the saturation mixture, mass flow rate of the incondensable gas in the flowing mixture and the absolute concentration of the gauge gas within the calibration mixture.

Desirably, the saturation mixture is supplied to said ingress point by a blower. This ensures the ingress is saturated with saturation mixture.

Advantageously, the method of measuring the rate of ingress of an incondensable gas, additionally comprises the steps of injecting a quantity of bias gas into the flow path upstream of the ingress, said bias gas comprising said gauge gas; and determining the concentration of the gauge gas in the test mix in the absence of injected bias gas as a function of concentration of gauge gas in the test mix measured by the leak detector whilst the bias gas is injected into said flowing mixture, and concentration of gauge gas in the test mix measured by the leak detector in the absence of supply of saturation mixture to said ingress point. This allows the output of the leak detector to be offset upwards into a desirable measurement range closer to the calibration value. It also provides a check that the whole system is operating correctly, that the gauge gas has not run out and, because the value of this bias signal is proportionate to the air flow in the pipe, provides a check that the total rate of air flow past of the sampling point has not changed. This is important as new leaks can occur whilst testing is taking place—if this happens the subsequent measurements would be incorrect.

Other preferred and advantageous features of the various aspects of the present invention will be apparent from the following description.

BRIEF DESCRIPTION OF THE DRAWINGS

Specific embodiments of the present invention will now be described, by way of example only, with reference to the accompany drawings, in which.

DETAILED DESCRIPTION

Figure 1:
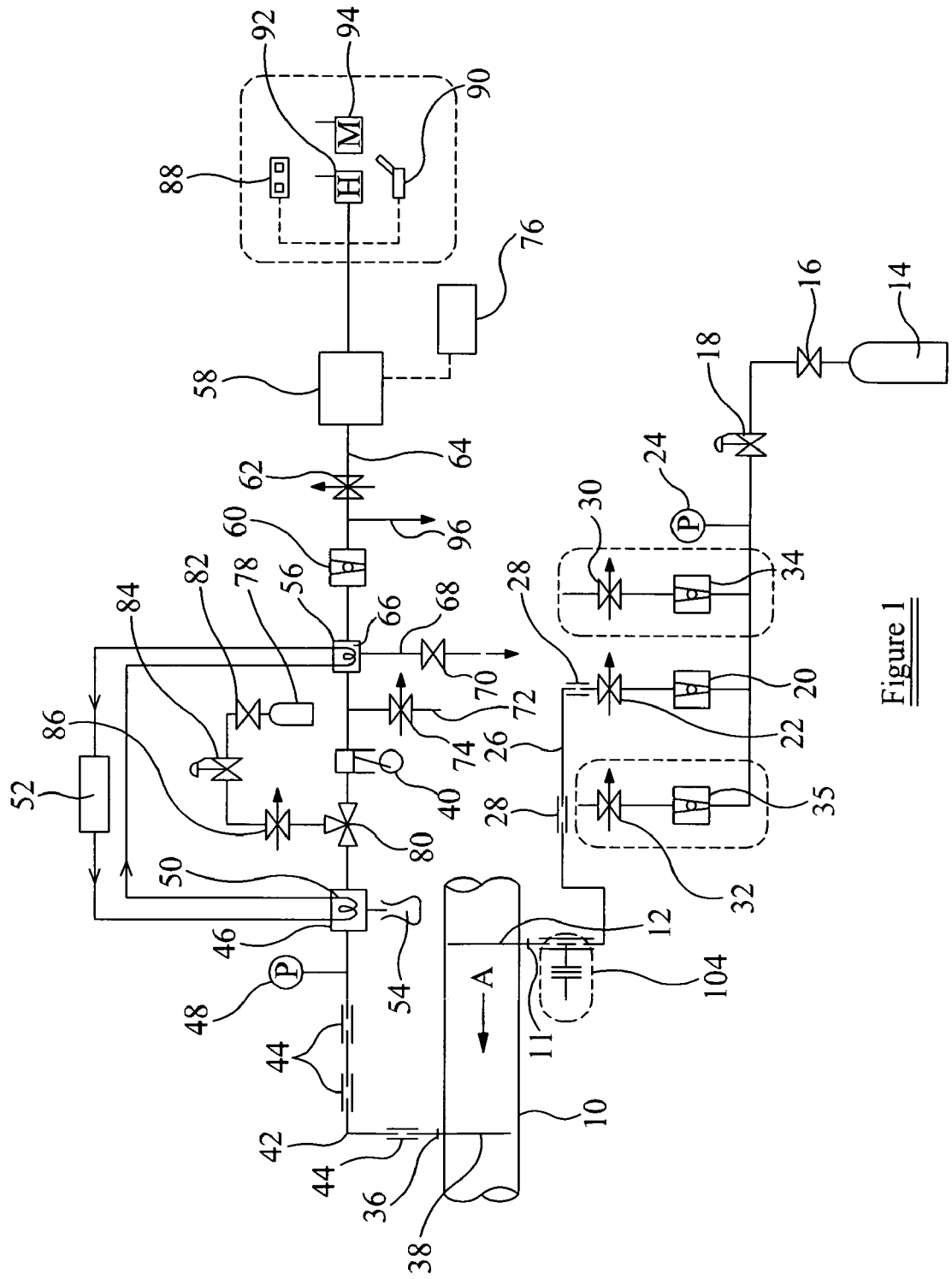
FIG. 1 shows a schematic view of apparatus used in a method of measuring gas flow in accordance with an embodiment of a first aspect of the present invention.

Referring to FIG. 1, the apparatus is situated at an exhaust of a steam turbine (not shown). The exhaust comprises a conduit 10 through which a mixture of an incondensable gas and a condensable gas flows in the direction indicated by the arrow A at sub atmospheric pressure. In this case, the condensable gas is steam and the incondensable gas is air. However, it will be appreciated that they could be any condensable and incondensable gas. It should also be noted that in this specification the term 'gas' is taken to be not only a pure gas, but may also be a mixture of gases. For example, air is a mixture of nitrogen, oxygen, argon, carbon dioxide and various other gases. The following method is used to measure the gas flow of the incondensable gas, i.e. air in this case. The system is capable of measuring the incondensable gas flow over a large range of air/steam mixture ratios from 100% air to well under 1% air.

A known quantity of a gauge gas, helium in this case, is injected into the conduit 10 at an inlet point 11 via an inlet probe 12. It is preferable that the gauge gas is chosen such that it does not react with the mixture of incondensable gas and condensable gas, as this will lead to inaccurate results. Examples of generally unreactive gases include the noble gases. The probe 12 takes the form of a hollow tube which extends into the conduit 10. The probe 12 is sealed to the conduit 10 so that no atmospheric air can pass therebetween into said conduit 10. The probe 12 may be open-ended at a first end that extends into said conduit 10, in which case it is preferable that the distance inside the conduit 10 to which the probe 12 extends is half the pipe diameter, so that the opening is disposed substantially at the centre of the conduit 10. Alternatively, the probe 12 may be sealed at said first end and have several holes along its length to ensure the gauge gas is distributed across the diameter of the conduit 10, in which case it is preferable that the length of the probe 12 is such that it substantially extends across the entire diameter of the conduit 10. This is particularly important if the conduit 10 cross-section is large or the flow rate of gases within the conduit 10 is high, as it ensures good mixing of the gauge gas with the other gases in the conduit 10. It is important to prevent poor mixing as this results in erratic results.

The probe 12 may be installed in an existing conduit 10 using a gland fitting (not shown) with BSPT type male thread installed in a BSPT type tapping, which is made in the conduit 10. This type of probe assembly, comprising a probe 12 and gland fitting, can be installed without taking the turbine out of service. The procedure for installing the probe assembly is a follows. A pilot hole is drilled; the hole is sealed with a temporary cover; the hole is then opened out with a tap drill; the hole is then re-sealed and finally the BSPT tap is used to produce the thread. The probe assembly can then be screwed into place. The procedure takes about 90 seconds per tapping. The expeditious nature of this process is important so as to ensure that not too much air is introduced into the system which may prejudice the operation of the turbine. This is especially the case with smaller turbines, or if the air ingress rate into the conduit 10 due to leaks is already very high.

The gauge gas is held at pressure in a gas bottle 14 and is fed to a second end of the probe 12 via a bottle valve 16, pressure regulator 18, flowmeter 20 and injection flow control valve 22. Intermediate said pressure regulator 18 and flowmeter 20 is a pressure meter 24, so that the pressure of the gas being supplied to the flowmeter 20 can be observed and also the operation of the pressure regulator 18 can be checked. Intermediate the flow control valve 22 and the probe 12 is a flexible tube 26 having a plurality of tube connectors 28. The flexible nature of the tube 26 and the tube connectors 28 allow the tube 26, which is linked at one end to the probe 12, to be releasably sealed, at its other end, in a gas-tight manner to one of a plurality of flow control valves 22, 30, 32. Each of the control valves 22, 30, 32 is associated with a corresponding flowmeter, 20, 34 and 35 respectively, each flowmeter being calibrated to measure flow rate over a particular range of values. For example, FIG. 1 shows a high flow flowmeter 34, a medium flow flowmeter 20 and a low flow flowmeter 35. By selecting a particular control valve 22, 30 or 32 and associated flowmeter 20, 34, 35 respectively, different flow rates of gauge gas can be measured and supplied to the probe 12.

Suitable material for the tube 26 is ¼" (6.35 mm) nylon tube or similar, the size of which is a good compromise between low tube volume for fast response and a sufficient size for physical robustness. The connectors 28 must be substantially gas tight and may be resilient silicone rubber sleeves with a 6 mm internal diameter and a 12 mm outer diameter.

One type of flowmeter 20, 34, 35 that may be used is a Brooks™ Sho-Rate™ flowmeter or equivalent. The flowmeter 20, 34, 35 is fed with a supply of helium at a regulated pressure, for example, 1 bar. The flow control valve 22, 30 or 32 is fitted downstream of the flowmeter 20, 34, 35 with respect to the flow of the gauge gas. This ensures the density of the helium remains constant. If the flow control valve 22, 30 or 32 is upstream of the flowmeter 20, 34, 35, the helium inside the flowmeter is at an unknown pressure and density, which is a function of, amongst other things, flowrate measured by the flowmeter 20, 34, 35. If, as in the current embodiment, the flow control valve 22, 30 or 32 is downstream of the flowmeter 20, 34, 35, the helium in the flowmeter is at the pressure set on the regulator 18 and measured by the pressure meter 24 adjacent to the flowmeter. This pressure is the same as when a previous calibration operation was carried out on the flowmeter 20, 34, 35. It may be necessary to change the regulator 18 pressure when using different flowrates to ensure this pressure remains constant. The flowmeter 20, 34 or 35 is calibrated at a series of flow rates across the range of the flowmeter by use of a bubble test flowmeter (not shown), with compensation made for the variation in temperature and pressure during calibration. The bubble test flowmeter is calibrated in a known manner, and as such further details are omitted. Using this gauge gas injection method, the rate of helium injection can be determined to within approximately 1%.

Downstream of the inlet point, with respect to the direction of flow of the mixture of incondensable gas and condensable gas, at a distance sufficient to ensure the gauge gas is uniformly mixed with said flowing mixture, is a sample point in the conduit 10.

This uniform mixture of said incondensable gas, said condensable gas and said gauge gas is known as the gauge mix. A sample of the gauge mix is drawn off from the conduit 10 at the outlet point 36 under the action of a vacuum pump 40, via a similar probe 38 and gland assembly arrangement as that used at the inlet point 11. Intermediate the probe 38 and the vacuum pump 40 is a sample tube 42, a plurality of tube connectors 44 and a condenser 46.

The pump 40 must be capable of generating a vacuum well below the lowest pressure in the system to allow for frictional losses in the sample tube 42. A suitable pump 40 is a KNF Neuberger™ four head diaphragm pump for pressures down to about 20 mbar or alternatively a three head pump with a double diaphragm first stage may be used.

The sample tube 42 may be of ⅜" (9.925 mm) diameter nylon construction, which provides a good compromise between low volume for fast sampling and large diameter for low frictional losses. The connectors 44 may create a highly gas-tight seal between themselves and that to which they are connected. The connectors 44 may be made from silicone rubber and have a 6 mm internal diameter and 12 mm outer diameter. In order to make a seal, both tube 42 and inside of the connectors 44 must be reasonably clean, but the system will tolerate minor soiling. It is important that the sample tube 42 is arranged either, ideally, with a drainage fall between the probe 38 and condenser 46, or, alternatively, with one high point between the probe 38 and condenser 46 so that drainage falls back to either end. This is because the presence of water, which blocks gas flow within the sample tube 42, may prevent a sample from being drawn off from the conduit 10, if the gas within the conduit 10 is at a high vacuum. There is also a sample vacuum gauge 48 intermediate the condenser 46 and sample point 36, so as to provide guidance on the level of vacuum in the conduit.

The condenser 46 is typically of a standard water-cooled type and as such the working of which is not discussed in detail herein. A cooling coil 50 of the condenser 46 is fed with chilled water from a chiller 52 at just above freezing point. Although, in the current embodiment the condenser 46 is water cooled, it could be of any suitable type. The condenser 46 drains to a container 54 to which it is connected by a vacuum tight seal. The container 54 is periodically emptied to remove any condensate, which in the current case would comprise water, leaving a so-called test mix gas.

The test mix passes through the vacuum pump 40 and into a cold trap 56 and then to a leak detector 58 via a sample flowmeter 60 and leak detector inlet valve 62 respectively along a test mix tube 64.

The cold trap 56 acts so as to substantially remove any residual moisture within the test mix remaining after its passage through the condenser 46. Again, its functioning is entirely conventional and as such is not discussed any further. However, the cold trap 56 is manufactured to a unique design, whereby a condensing section 66 of the cold trap 56 is fitted with a third connection to a drainage tube 68, which drains to waste via an isolating valve 70. This allows the trap 56 to be drained regularly whilst in use. The cold trap 56 also acts so as to cool the test mix before it enters the leak detector 58, as the vacuum pump 40 may be warm and as such it may heat the gas passing through it. The cold trap 56 is also supplied with chilled water by the chiller 52.

As the test mix flow rate may be very small, almost undetectable, the volume of the test mix tube 64 should be kept to a minimum. An example of pipe which may be used is $\frac{1}{16}''$ (1.59 mm) nylon or stainless steel pipe.

Intermediate the vacuum pump 40 and the cold trap 56, there is provided a waste outlet 72 having a dump valve 74. Hence, the dump valve 74 allows the test mix flow to be reduced without restricting the flow. The waste outlet 72 is at substantially atmospheric pressure.

The leak detector inlet valve 62 has a short waste outlet 96 fitted to the inlet port. The waste pipe 96 is short in nature so as to minimise any energy loss due to frictional forces within the pipe 96. The waste pipe 96 ensures that the inlet port is maintained at atmospheric pressure despite variations in test mix flowrate. A portion of the test mix is supplied to the leak detector 58 via the inlet valve 62.

The leak detector 58, which is powered by power supply 76, is of a conventional type, examples of which being the Leybold™ UL100+ or UL200. These types of machines use a mass spectrometer for helium detection and utilise a reverse flow turbo molecular pump to evacuate the mass spectrometer chamber. To improve the output stability of the leak detector 58, the power supply 76 is voltage stabilised, typically being of the "buck & boost" type, to stabilise the voltage to within 2.5% of the nominal input voltage. The leak detector 58 provides an output, wherein there is a proportionate change in the output corresponding to a change in the conventional concentration of helium in the sample. However, said output is only linearly proportionate over a small portion of the output range of the leak detector 58 and may be unstable over time. In the present specification the term 'absolute concentration' is defined as the proportion of the total weight of the gas concerned which is due to the weight of the gauge gas. The 'absolute concentration' has an absolute value and may be given as a percentage. Similarly, the term 'concentration' is a numeric value that may be given in any appropriate unit, which is output by the leak detector 58, there being a relationship between the 'concentration' and the 'absolute concentration'. Such a relationship may be substantially linear over a particular range of 'concentration' and 'absolute concentration' values.

The definition of the term the term 'absolute concentration' as the proportion of the total weight of the gas concerned, which is due to the weight of the gauge gas is for convenience only. 'Absolute concentration' could just as well be defined as the proportion of the total volume of the gas concerned which is due to the volume of the gauge gas, or any other quantitative measure indicative of the proportion of gauge gas within the gas as a whole. It should be noted, however, that the use of other such quantitative measures may result in the need for an additional scale factor in the following formulae 1 and 2 (e.g. the ratio between the atomic weight of helium and the average atomic weight of air, if the volume proportion of the gauge gas is used).

In order to make accurate concentration measurements using the leak detector 58, the concentration of the gauge gas, helium in this case, in the test mix is compared with the concentration of a sample of helium/air mixture of a known absolute concentration. This is achieved by calibrating the output of the leak detector 58 with a calibration mixture prior to the measurement of the test mix concentration. To calibrate the leak detector 58, a calibration mixture is used which has a known helium concentration (i.e. absolute concentration) chosen to be similar to the helium concentration within the test mix, typically about 150 wppm (parts per million by weight). The calibration mixture is provided in a gas bottle 78 which has been filled in such a way that the absolute concentration of the helium within the calibration mixture is accurate to within 2%. The method of filling said gas bottle 78 is such that the absolute concentration of the helium is said to be determined by reference to national standards. Within the current specification, the term 'by reference to national standards' means that the calibration mixture is produced by gravimetric methods following the principles of ISO6142: 2001 (Gas analysis—Preparation of calibration gas mixtures—Gravimetric method). This involves the addition of gases by mass using electronic balances calibrated by a UKAS (United Kingdom Accreditation Service) accredited company and using weights that are traceable to national standards. The mixtures are then analytically cross-checked against gravimetric standards. These can be internally or externally produced although NPL (National Physical Laboratory) secondary standards are used where available.

The calibration mixture is supplied from said gas bottle 78 to a three-port changeover valve 80 interposed between the condenser 46 and the vacuum pump 40, and from there along the same hereinbefore described path to the leak detector 58. The operation of the valve 80 is such that only the test mix from the condenser 46 or the calibration mixture from the gas bottle 78 can be supplied to the leak detector 58 via the vacuum pump 40 at any one time. During calibration, the calibration mixture is fed at any convenient low pressure, e.g. approximately 0.3 bar, to the changeover valve 80 via gas bottle valve 82, pressure regulator 84 and mixture control valve 86 respectively. The calibration mixture then passes along the same path to the leak detector 58 as the test mix, ensuring that the calibration mixture is at the same temperature and pressure as the test mix. This is important as variations in either temperature or pressure will result in a change in the concentration of a gas. The flow rate of the calibration mixture is adjusted using the calibration mixture control valve 86 so that the flow indicated on the flowmeter 60 is the same as the flow rate indicated when the test mix is being supplied and the concentration of the gauge gas within the calibration mixture is measured by the leak detector 58. The apparatus may be recalibrated in this manner as often as required to maintain accuracy and check that the measuring system is functioning correctly. The output of the leak detector is commonly a logarithmic scale typically from $10^{-11}$ to $10^{-1}$ mbar·l·s$^{-1}$, however the output in the lower ranges is usually noisy and is therefore normally best avoided as this will lead to less accurate results. It should be noted that the output units of the leak detector 58 are substantially immaterial as the leak detector is being used as a comparator.

In order to measure the helium concentration of the test mix, the changeover valve 80 is operated to allow the test mix to flow to the leak detector 58. The dump valve 74 is adjusted to give half-scale flow on the sample flowmeter 60. Ideally, the calibration operation described above should also be performed with half-scale flow on the sample flowmeter 60. For best results, and assuming there is sufficient sample to give more than half-scale flow on the sample flowmeter 60, the dump valve 74 should be opened until the sample flow is at half-scale. If this is not done there may be a noticeable loss of accuracy. If there is not sufficient sample to give half-scale flow the reduction in accuracy may be negligible, provided, that there is sufficient sample to ensure the leak detector does not draw in any air through the waste pipe 96.

The concentration of the gauge gas within the test mix is then output by the leak detector 58.

The mass flow rate of the incondensable gas, air in this case, is then determined according to the following formula $$M = \frac{mR_{Cal}}{C_{Cal}R_S} \quad (1)$$

wherein, M is the mass flow rate (typically given in kg/hr) of incondensable gas in the flowing mixture within the conduit 10; $R_{Cal}$ is the concentration of the gauge gas in the calibration mixture measured by the leak detector 58; m is the mass flow rate (typically given in kg/hr) of the injected gauge gas measured by the flowmeter 20, 34 or 35; $R_S$ is the concentration of the gauge gas in the test mix measured by the leak detector 58; and $C_{Cal}$ is the absolute concentration of the gauge gas within the calibration mixture.

The numeric output, which is proportional to the concentration, may be read directly from a display (not shown) on the leak detector 58, but is usually directed to a chart plotter 88, or chart plotting software on a computer, 90 to allow a trace to be seen. The output may also be directed to software set up to calculate the leakage rate. To improve accuracy the rate can be averaged over, say, a 10 second period. The software can store the calibration figure and the injection rate thus allowing direct display of the leakage in the commonly used mass flow rate units, for example lb/hr, kg/hr and scfm (standard cubic feet per minute).

In addition to, or in the place of, the leak detector 58 having a local display showing the leak detector output, the leak detector 58 may be provided with a remote display. This may take the form of a display which is connected to the leak detector with a flexible lead or, more conveniently, a wireless system. The wireless system may comprise a transmitter 92, linked to or part of the leak detector 58, which broadcasts an electromagnetic signal to a receiver 94.

When measuring very low mass flow rates of the incondensable gas, high concentrations of the gauge gas, helium, will pass to the leak detector 58. The leak detector 58 has a limited range of concentrations of gauge gas to which it is responsive and as such the high helium concentration may result in an inaccurate leak detector 58 output. In addition, as hereinbefore discussed, the linear relationship between absolute concentration and concentration is also confined to a restricted range. As such, helium concentrations far removed from that of the calibration mixture will not be accurately measurable by the leak detector 58. In order to overcome this problem, a bias leak 104 may be used. The bias leak 104 may be installed anywhere upstream of the sample point 36 with respect to the direction of flow of the flowing mixture within the conduit 10. In FIG. 1, the bias leak 104 is intermediate the injection probe 12 and the injection tube 26. The bias leak 104 comprises an orifice open to the atmosphere, so as to permit the flow of additional incondensable gas, air in this case, into the system at a known rate. One example is the use of a 3.2 mm orifice giving a leak with approximately 5 kg/hr of airflow.

The presence of additional air within the flowing mixture, due to the bias leak 104 lowers the actual concentration of the gauge gas within the flowing mixture such that it can be accurately measured by the leak detector 58 (as it now lies within the operating range and said linear relationship range of the leak detector 58). Measurement of the concentration of the gauge gas within the flowing mixture can then be made by the leak detector 58; the mass flow rate of incondensable gas in the flowing mixture within the conduit 10 calculated; and the known mass flow rate due to the bias leak 104 subtracted so as to give an actual mass flow rate of incondensable gas in the flowing mixture due to leaks other than the bias leak 104.

Once the mass flow rate of incondensable gas in the flowing mixture within the conduit 10 has been determined, it is possible to determine the mass flow rate of incondensable gas entering the low pressure system at a particular leak zone. Parts of the system which may leak include holes, leaking joints, rotating glands or areas of porosity. The leak zone may comprise one or more individual leak points, also known as ingress points.

In order to measure the mass flow rate of air entering the system in a particular leak zone, also known as the leak flow, the leak zone is flooded by a saturation mixture of gauge gas and incondensable gas of known absolute concentration of gauge gas, such that only the saturation mixture is drawn in to the system via any leak(s) in the leak zone.

Figure 2:
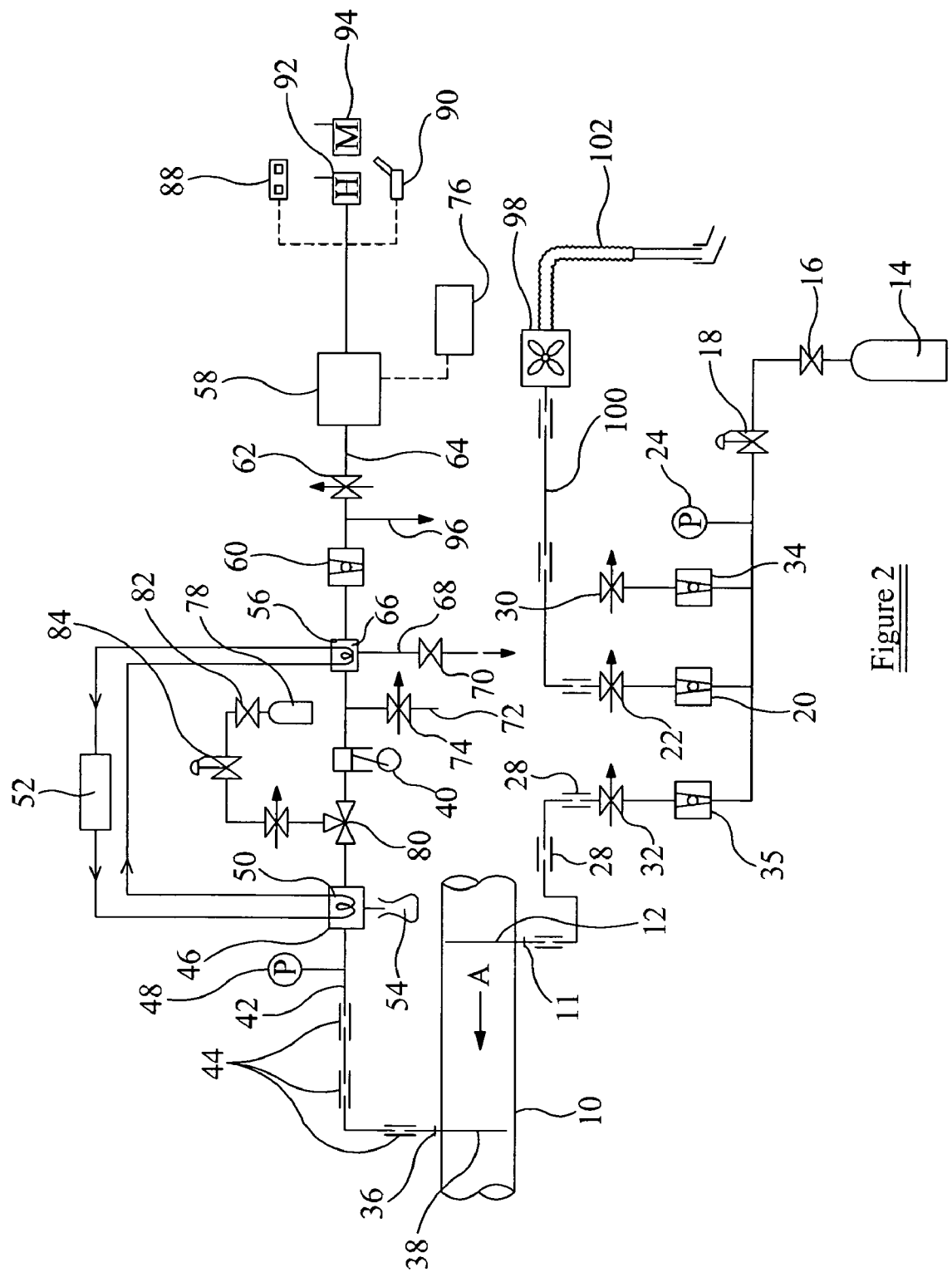
FIG. 2 shows a schematic view of apparatus used in a method of measuring the rate of ingress of a gas in accordance with an embodiment of a second aspect of the present invention.

The apparatus used in the leak flow measurement is shown in FIG. 2 and is substantially similar to that of FIG. 1 with equivalent parts having the same numbering. However, there is additionally provided an air blower 98 which is fed with a known quantity of gauge gas via a feed 100. The gauge gas and air mix within the blower 98 to form the saturation mix, which is delivered to the leak zone via a long flexible delivery hose 102. One type of blower that has been utilised is a reversible vacuum cleaner which has a capacity of about 160 kg/hr. The absolute concentration of the saturation mixture may have been previously determined, for example by the supplier, or may be determined using the leak detector 58. It should be noted that although in the current embodiment the gauge gas injected into said conduit 10 and the gauge gas used to form the saturation mix have a common supply, i.e. gas bottle 14, this need not be so.

In measuring the leak flow, first the mass flow rate of incondensable gas in the flowing mixture within the conduit 10 is determined as hereinbefore described at a sample point. The process is then repeated, whilst the leak zone is supplied with saturation mixture, wherein the sample point is at a part of the conduit 10 through which all the leakage entering upstream of the sample point must flow. In a typical arrangement of steam turbine, this could be where the steam enters a main condenser.

The mass flow rate of air entering the leak site is then determined in accordance with the following formula:

$$L = \frac{MR_L C_{Cal}}{R_{Cal} C_H} \quad (2)$$

wherein, L is the mass flow rate of incondensable gas entering the conduit 10 in the leak zone; $R_L$ is the concentration of the gauge gas in the test mix measured by the leak detector leak whilst the leak zone is flooded by the saturation mixture; $R_{Cal}$ is the concentration of gauge gas in the calibration mixture measured by the leak detector; M is the mass flow rate of the incondensable gas in the flowing mixture; $C_{Cal}$, is the absolute concentration of the gauge gas within the calibration mixture; and $C_H$ is the absolute concentration of the gauge gas in the saturation mixture.

As previously discussed, for accurate results, it is important that the gauge gas concentration being measured by the leak detector 58 is as close as possible to that of the calibration mixture such that the linear relationship between absolute concentration and concentration of the gauge gas remains sound.

Whilst determining the mass flow rate of air entering the conduit 10 in the leak zone, should the leak(s) in the leak zone be very small, the amount of saturation mixture entering the conduit via the leak zone will also be very small. This results in only a small quantity of gauge gas reaching the leak detector 58, such that the gauge gas concentration is much less than that of the calibration mixture. To overcome this problem it is possible to inject a bias gas comprising the gauge gas into the conduit 10 at a point upstream of the sample point 36 with respect to the direction of flow of the flowing mixture. The quantity of bias gas injected is chosen so as to cause the absolute concentration of gauge gas which enters the leak detector 58, and hence the concentration output by the leak detector, to be similar to that of the calibration mixture.

The concentration of the gauge gas in the test mix whilst the leak zone is flooded by the saturation mixture, $R_L$, can then be determined according to the following formula:

$$R_L = R_{L+B} - R_B \quad (3)$$

wherein, $R_{L+B}$ is the concentration of the gauge gas in the test mix measured by the leak detector 58 whilst the leak zone is flooded by the saturation mixture and the bias gas is injected into said conduit 10; and $R_B$ is the concentration of the gauge gas in the test mix measured by the leak detector 58 in the absence of supply of saturation mixture to said ingress point, i.e. with the injection of bias gas only.

It will be appreciated that a wide range of modifications and alterations may be made to the embodiments of the invention described hereinbefore without departing from the scope of the invention as defined by the appended claims. Such examples include, but are not limited to, the use of a separate chiller for the cold trap and the condenser, using a chiller and/or condenser coolant other than water, and the use of the method for the measurement of incondensable gas flows in other mixtures of condensable and incondensable gases, although if the condensation temperature and/or pressure of the condensable gas differs from those of steam, modifications to the condensing stages and other parts of the apparatus may be necessary.

The invention claimed is:

1. A method of measuring the gas flow of an incondensable gas in a flowing mixture of said incondensable gas and a condensable gas comprising the steps of:
    a) calibrating a leak detector at a given temperature and pressure with a calibration mixture supplied at a given flow rate, said calibration mixture comprising a gauge gas of known absolute concentration and said incondensable gas, the concentration of said gauge gas in the calibration mixture being measured by the leak detector;
    b) injecting a known quantity of gauge gas at a known mass flow rate into said flowing mixture of gases at an inlet point which is sufficiently spaced from a sample point which is downstream of the inlet point so as to ensure that, at said sample point, there is a uniform gauge mix of said gauge gas and said mixture of gases;
    c) drawing a sample of the said gauge mix off at said sample point,
    d) passing said sample through a condenser so as to remove said condensable gas from the gauge mix, resulting in a test mix;
    e) passing the said test mix into the leak detector at said given temperature, pressure and flow rate, the leak detector measuring the concentration of said gauge gas within the test mix;
    f) calculating the mass flow rate of said incondensable gas within said flowing mixture as a function of concentration of gauge gas in the calibration mixture, concentration of the gauge gas in the test mix, mass flow rate of the injected gauge gas and the absolute concentration of the gauge gas within the calibration mixture.

2. A method of measuring gas flow as claimed in claim 1, further comprising a step (g), prior to step (e), of cooling said test mix before it enters the leak detector.

3. A method of measuring gas flow as claimed in claim 1, wherein, in step (d), the uncondensed portion of the gauge mix is passed through a cold trap to yield said test mix.

4. A method of measuring gas flow as claimed in claim 1, wherein, in step (c), a vacuum pump draws off the sample of the gauge mix.

5. A method of measuring gas flow as claimed in claim 1, wherein the gauge gas is a noble gas.

6. A method of measuring gas flow as claimed in claim 1, wherein the incondensable gas is air.

7. A method of measuring gas flow as claimed in claim 1, wherein the condensable gas is steam.

8. A method of measuring gas flow as claimed in claim 1, wherein the flowing mixture is at the exhaust to a steam turbine.

9. A method of measuring gas flow as claimed in claim 1, wherein the leak detector comprises a mass spectrometer.

10. A method of measuring gas flow as claimed in claim 1, additionally comprising the steps of injecting a known quantity of a bias gas at a known mass flow rate into said flowing gas mixture upstream of the sample point, said bias gas comprising said incondensable gas; and determining the concentration of the gauge gas in the test mix in the absence of injected bias gas as a function of concentration of the gauge gas in the test mix measured by the leak detector whilst the bias gas is injected into said flowing mixture and concentration of the gauge gas within the test mix measured by said leak detector whilst the flowing gas mixture contains only said injected bias gas and said injected gauge gas.

11. A method of measuring the rate of ingress of an incondensable gas, at a relatively high pressure, at an ingress point along a flow path of a flowing mixture of said incondensable gas and a condensable gas, at a relatively low pressure, comprising the steps of:
   a) calibrating a leak detector at a given temperature and pressure with a calibration mixture supplied at a given flow rate, said calibration mixture comprising a gauge gas of known absolute concentration and said incondensable gas, the concentration of said gauge gas in the calibration mixture being measured by the leak detector;
   b) supplying a saturation mixture to said ingress point at flow rate sufficient such that only the saturation mixture enters said flow path via the ingress point, said saturation mixture comprising said incondensable gas and said gauge gas and being of known absolute concentration of gauge gas;
   c) selecting a sample point which is sufficiently spaced downstream from the ingress point such that the saturation mixture is uniformly mixed with said mixture of gases so as to form a uniform gas mix when or before it reaches the sample point;
   d) drawing a sample of the uniform gas mix off at said sample point;
   e) passing said sample through a condenser operating so as to remove said condensable gas from the uniform gas mix, resulting in a test mix;
   f) passing said test mix into the inlet of the leak detector at said given temperature, pressure and flow rate, so as to measure the concentration of the gauge gas in the test mix,
   g) determining the mass flow rate of said incondensable gas within said flowing mixture in accordance with the method of claim 1;
   h) calculating the mass flow rate of the ingress of the incondensable gas as a function of concentration of gauge gas in the calibration mixture measured by the leak detector, absolute concentration of the gauge gas in the saturation mixture, concentration of gauge gas in the test mix measured by the leak detector, mass flow rate of the incondensable gas in the flowing mixture and the absolute concentration of the gauge gas within the calibration mixture.

12. A method of measuring ingress rate as claimed in claim 11, further comprising a step (i), prior to step (f), of cooling said test mix before it enters the leak detector.

13. A method of measuring ingress rate as claimed in claim 11, wherein, in step (e) the uncondensed portion of the uniform gas mix is passed through a cold trap to yield said test mix.

14. A method of measuring ingress rate as claimed in claim 11, wherein, in step (d), a vacuum pump draws off the sample of the uniform gas mix.

15. A method of measuring ingress rate as claimed in claim 11, wherein the gauge gas is a noble gas.

16. A method of measuring ingress rate as claimed in claim 11, wherein the incondensable gas is air.

17. A method of measuring ingress rate as claimed in claim 11, wherein the condensable gas is steam.

18. A method of measuring ingress rate as claimed in claim 11, wherein the saturation mixture is supplied to said ingress point by a blower.

19. A method of measuring ingress rate as claimed in claim 11, additionally comprising the steps of injecting a quantity of a bias gas into the flow path upstream of the ingress, said bias gas comprising said gauge gas; and determining the concentration of the gauge gas in the test mix in the absence of injected bias gas as a function of concentration of the gauge gas in the test mix measured by the leak detector whilst the bias gas is injected into the flow path and concentration of the gauge gas in the test mix measured by the leak detector in the absence of supply of saturation mixture to said ingress point.

\* \* \* \* \*